(12) United States Patent
Lundgren

(10) Patent No.: US 6,934,059 B2
(45) Date of Patent: Aug. 23, 2005

(54) COMPACT OUTPUT-RETAINING PAPER HANDLING FOR PORTABLE PRINTER

(75) Inventor: Mark A. Lundgren, Corona, CA (US)

(73) Assignee: The Boeing Company, Chicago, IL (US)

(*) Notice: Subject to any disclaimer, the term of this patent is extended or adjusted under 35 U.S.C. 154(b) by 735 days.

(21) Appl. No.: 09/944,339

(22) Filed: Aug. 30, 2001

(65) Prior Publication Data
US 2003/0043422 A1 Mar. 6, 2003

(51) Int. Cl.$^7$ .............................. H04N 1/04; H04N 1/23
(52) U.S. Cl. .................. 358/498; 358/296; 347/104; 347/108
(58) Field of Search ........................... 358/498, 496, 358/401, 501, 296, 400, 500, 472; 271/3.14, 4.01, 162, 145, 629, 643; 400/624, 625, 629, 643; 347/104, 108, 3; 399/393, 388

(56) References Cited

U.S. PATENT DOCUMENTS

| | | | | |
|---|---|---|---|---|
| 4,969,048 A | * | 11/1990 | Hoshino | 358/296 |
| 5,897,110 A | * | 4/1999 | Fujiwara | 271/4.01 |
| 5,944,306 A | * | 8/1999 | Maeda et al. | 271/145 |
| 6,106,178 A | * | 8/2000 | Chiu | 400/624 |
| 6,252,683 B1 | * | 6/2001 | Kawamura et al. | 358/498 |
| 6,474,884 B2 | * | 11/2002 | Chiu | 400/624 |

* cited by examiner

Primary Examiner—Cheukfan Lee
(74) Attorney, Agent, or Firm—Harness Dickey & Pierce P.L.C.

(57) ABSTRACT

A portable printer is provided including a paper retention mechanism removably coupled to a printing assembly. The paper retention mechanism includes a housing divided into a supply paper compartment and a printed paper compartment. To conserve space, the printed paper compartment is located in a stacked configuration relative to the supply paper compartment. The printed paper compartment also includes a transparent panel to allow viewing of printed pages. The panel is also able to be opened to allow removal of printed pages.

12 Claims, 2 Drawing Sheets

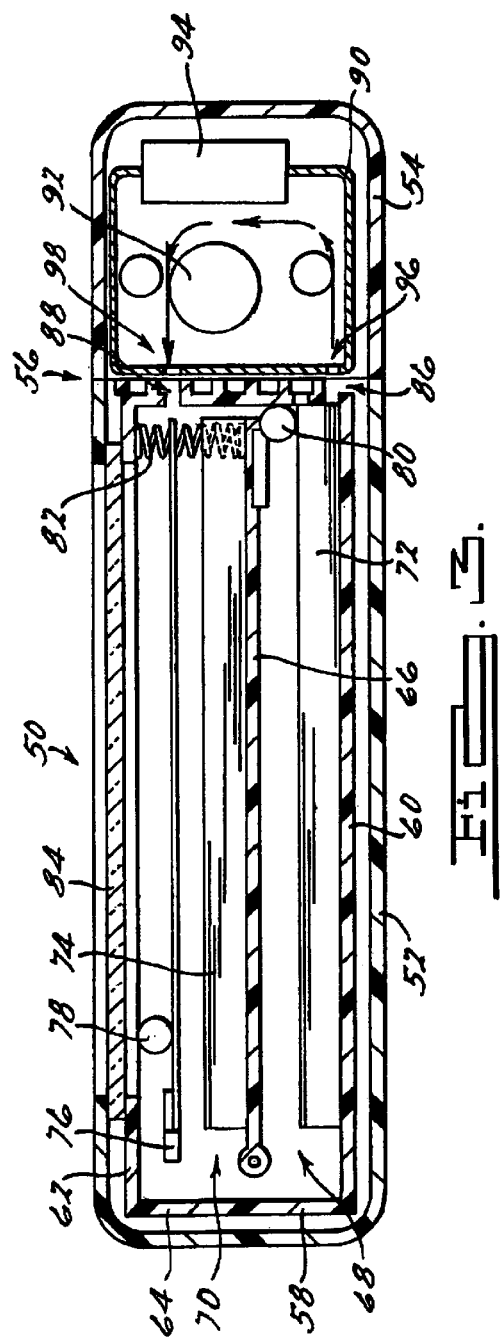
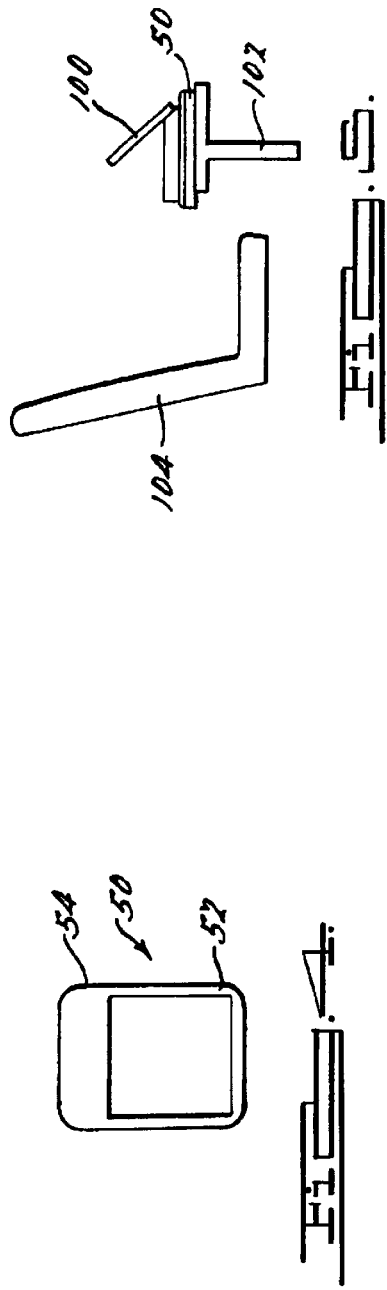

COMPACT OUTPUT-RETAINING PAPER HANDLING FOR PORTABLE PRINTER

FIELD OF THE INVENTION

The present invention relates to computer printers, and more particularly to a portable computer printer which retains supply paper and printed paper within a common paper retention mechanism.

BACKGROUND OF THE INVENTION

Printers are commonly employed in association with personal computers to enable printing of the work product created on the computer. For example, many desktop computers are used in conjunction with a desktop printer for printing data therefrom. Referring to FIG. 1, one example of a conventional desktop printer is illustrated.

In FIG. 1, the desktop printer 10 includes a paper supply tray 12 adjacent a printing assembly 14. During printing, supply paper 16 disposed within the supply paper tray 12 is drawn into the printing assembly 14. The paper 16 is guided by a plurality of rollers 18 and printed on by printing element 20. The paper is then output as printed paper 22 onto a printed paper support surface 24.

While the desktop printer 10 is extremely effective for its intended purpose, such desktop printers 10 are too bulky to be easily transported. Further, while the printed paper support surface 24 provides an adequate place for the printed paper 22 to rest, the surface 24 does not provide a mechanism for retaining the printed paper 22 against shifting due to jostling and the like commonly encountered during travel.

In order to overcome the non-transportability of desktop printers, a few portable printers have been developed. Referring to FIG. 2, one example of a conventional portable printer is illustrated. Portable printer 30 includes a printing assembly 32 with a supply paper port 34 for accepting supply paper 36 and a printed paper port 38 for ejecting printed paper 40. A plurality of guide rollers 42 direct the supply paper 36 past a print element 44 and then out the printed paper port 38.

While the portable printer 30 solves many of the problems associated with desktop printers, it still has many drawbacks. For example, no paper supply tray is provided for retaining supply paper 36. Therefore, supply paper 36 must be individually manually fed into the printing assembly 32. Moreover, no printed paper receptacle is provided for catching and retaining printed paper 40. Accordingly, printed paper 40 may be haphazardly ejected onto the user, a floor, or other surroundings.

In view of the foregoing, it would be desirable to provide a portable printer for use during travel situations, such as on aircraft flights, which retains supply paper and printed paper in a paper retention mechanism. Furthermore, it would be desirable to provide a window in the paper retention mechanism to enable quick inspection of the printed paper during printing for quality insurance.

SUMMARY OF THE INVENTION

The above and other objects are provided by a portable printer including a paper retention mechanism removably coupled to a printing assembly. The paper retention mechanism includes a housing divided into a supply paper compartment and a printed paper compartment. To conserve space, the printed paper compartment is located in a stacked configuration relative to the supply paper compartment. The printed paper compartment also includes a transparent panel to allow easy viewing of printed pages. The panel is also able to be opened to allow removal of printed pages.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a top view of the portable printer device of the present invention;

FIG. 5 is a schematic side view illustrating the portable printer device of the present invention in an aircraft business seat environment; and FIG. 6 is a schematic side illustration of a plurality of portable printing devices according to the present invention in various locations of an aircraft passenger compartment.

DETAILED DESCRIPTION OF THE PREFERRED EMBODIMENTS

The following description of the preferred embodiments is merely exemplary in nature and is in no way intended to limit the invention, its application, or uses.

The present invention is directed towards a portable printer device particularly well suited for use within a mobile platform passenger compartment. The portable printer device includes a paper retention mechanism removably coupled to a printing assembly. The paper retention mechanism simultaneously retains supply paper and printed paper in a single, compact, housing. The paper retention mechanism also includes a transparent panel which enables viewing of printed pages. The panel is also able to be opened to allow removal of printed pages from the paper retention mechanism. Due to its compact size and paper retaining qualities, the portable printer of the present invention enables a business traveler to easily print in the confined spaces of a mobile platform for example an aircraft without concern for loose or lost papers.

Figure 1:
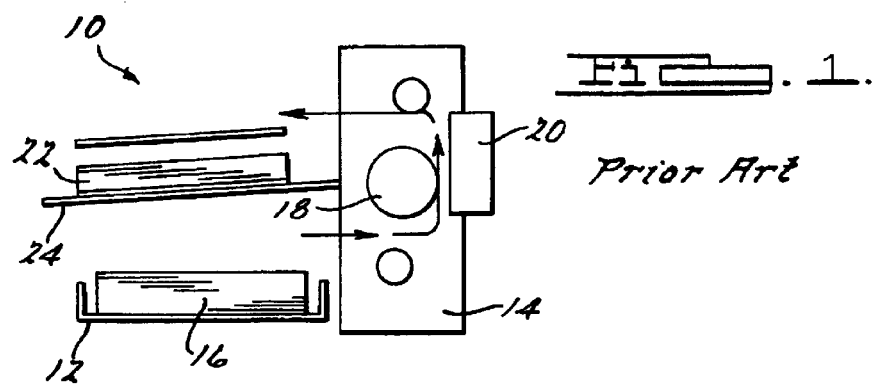
FIG. 1 is a schematic side view of a conventional desktop printer.
Figure 2:
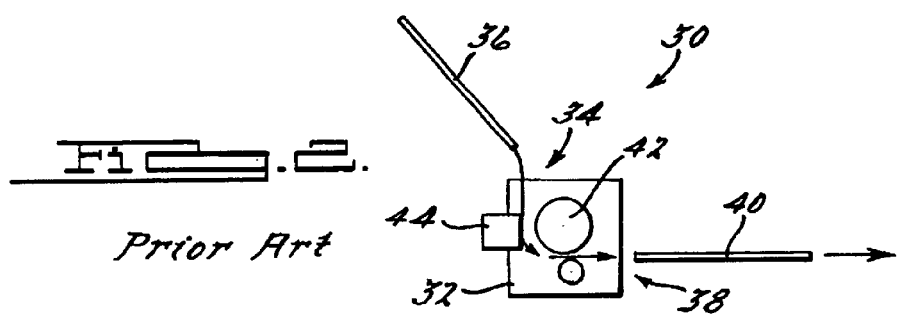
FIG. 2 is a schematic side view of a conventional portable printer.
Figure 3:
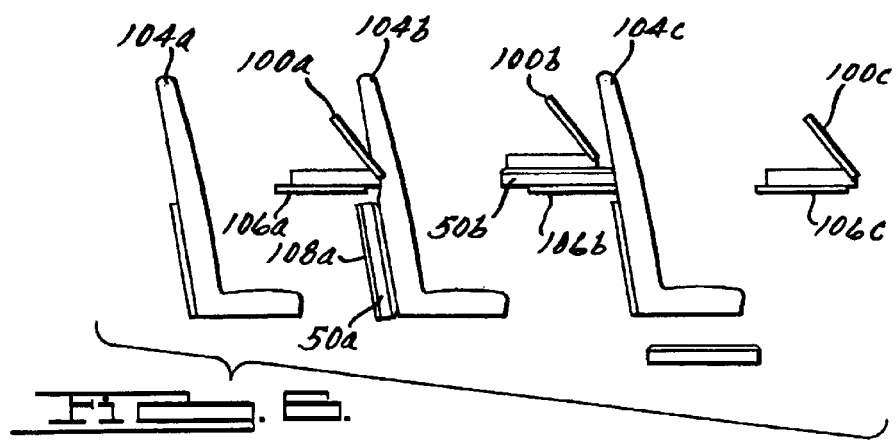
FIG. 3 is a schematic side view of a portable printer incorporating the teachings of the present invention.

Turning now to the drawing figures, FIG. 3 illustrates one embodiment of a portable printer incorporating the teachings of the present invention. The portable printer 50 includes a paper retention assembly 52 removably coupled to a printing assembly 54 along interface 56 by interconnecting tabs and slots (not shown). The paper retention assembly 52 includes a paper housing 58 including a generally planar first panel 60 spaced apart from a generally planar second panel 62 by a laterally oriented and preferably integral peripheral wall 64.

A generally planar divider 66 coupled to the wall 64 separates the interior volume of the housing 58 into a supply paper compartment 68 between the first panel 60 and the divider 66, and a printed paper compartment 70 between the second panel 62 and the divider 66. The supply paper compartment 68 and printed paper compartment 70 are enclosed by wall 64. Although other materials may be used, the housing 58 (including the divider 66) is preferably formed of plastic.

A plurality of sheets of supply paper 72 are disposed in an angled stack adjacent the first panel 60 and retained within the interior of the supply paper compartment 68. A plurality of sheets of printed paper 74 are disposed in an angled stack adjacent the divider 66 and retained within the interior of the printed paper compartment 70. A preferably spring-biased, overlapping printed paper guide tab 76 coupled to paper housing 58 orients the printed paper 74 within the printed paper compartment 70. To do this, the tab 76 preferably engages a corner portion (top and sides) of the stack of printed paper 74. A transverse printed paper roller guide 78 coupled proximate one end of the paper housing 58 also assists in this purpose.

A transverse supply paper roller guide 80 disposed along an opposite end of the paper housing 58 guides the supply paper 72 as it exits the supply paper compartment 68. A biasing member in the form of a coiled spring 82 coupled to paper housing 58 also assists in this purpose. While the supply paper roller guide 80 is illustrated as being coupled to the divider 66, it may also be coupled to the wall 64 or another portion of the housing 58.

The second panel 62 is preferably entirely transparent or may include a transparent portion or window 84 revealing an interior of the printed paper compartment 70. This enables a user to observe the printed paper 74 while it remains retained within the confines of printed paper compartment 70. The second panel 62 is also preferably removable or, at least, openable such that it operates in a first or closed mode enclosing the printed paper compartment 70 and in a second or opened mode exposing (i.e., enabling access to within) the printed paper compartment 70. This enables removal of printed paper 74 from the printed paper compartment 70.

Similarly, the divider 66 is preferably removable or at least pivotable from a first or closed position to a second or open position to enable restocking of supply paper 72 within supply paper compartment 68. If desired, a portion of the wall 64 or the first panel 60 may be made openable to enable access to within the supply paper compartment 68. While the divider 66 is illustrated as being pivotable about an end opposite the printing assembly 54, it may be made pivotable about its other end if desired. More preferably, the second panel 62 and the divider 66 pivot along the same ends.

To minimize space requirements, the supply paper compartment 68 is preferably aligned adjacent to and parallel with the printed paper compartment 70 in a striated, stacked or "one-on-top-of-the-other" configuration. A supply paper exit port 86 formed through one side of the paper housing 58 downstream of the supply paper compartment 68 enables individual sheets of the supply paper 72 to be distributed from the supply paper compartment 68 to the printing assembly 54. A printed paper entry port 88 formed through the side of the paper housing 58 upstream of the printed paper compartment 70 enables entry of individual sheets of the printed paper 74 into the printed paper compartment 70. Preferably, the supply paper exit port 86 and printed paper entry port 88 are formed adjacent to and parallel with one another along a common portion of the wall 64.

The printing assembly 54 includes a print housing 90 which includes a plurality of transverse guide rollers 92 disposed therein. At least one of the guide rollers 92 is disposed adjacent to and opposite an ink jet or other printing element 94 coupled to the print housing 90. The guide rollers 92 define a U-shaped or one hundred and eighty degree printing path for supply paper 72. Although other materials may be used, the housing 90 is preferably formed of plastic.

A supply paper entry port 96 formed through one side of the print housing 90 upstream of the printing element 94 enables entry of individual sheets of the supply paper 72 into the printing assembly 54. A printed paper exit port 98 formed in the side of the print housing 90 downstream of the print element 94 enables ejection of individual sheets of the printed paper 74 from the printing assembly 54. Preferably, the supply paper entry port 96 and printed paper exit port 98 are formed adjacent to and parallel with one another in a common wall of the print housing 90. Also, the supply paper entry port 96 is preferably aligned adjacent the supply paper exit port 86. Similarly, the printed paper exit port 98 is preferably aligned adjacent the printed paper entry port 88.

In operation, the paper retention assembly 52 is stocked with supply paper 72 and then a printing function is performed. Thereafter, individual sheets of the supply paper 72 are sequentially drawn into the printing assembly 54 and guided by guide rollers 92 such that they pass in front of the printing element 94. Printing element 94 prints on each sheet of the supply paper 72 thereby converting it to printed paper 74. Guide rollers 92 eject the sheets of printed paper 74 to the paper retention assembly 52 after printing. Accordingly, a closed loop system is provided for continuously retaining supply paper 72 and printed paper 74.

Since the portable printer 50 is intended for easy portability, it is preferably dimensioned accordingly. For example, as shown in FIG. 3, a height of the printer 50 may be approximately four (4) inches while, as shown in FIG. 4, its width may be ten (10) inches and its length fourteen (14) inches. These dimensions may be varied as desired to accommodate customer preferred paper sizes and/or printer assembly specifications.

Turning now to FIG. 5, the printer 50 is illustrated in conjunction with a laptop computer 100. In this environment, the laptop computer 100 is positioned on top of the printer 50. The printer 50 is supported on a table 102 proximate a seat 104. This exemplary environment replicates a business class aircraft passenger compartment. Advantageously, minimal space is required to accommodate the printer 50.

Turning now to FIG. 6, various other environments for using the printer 50 are illustrated. In this example, a plurality of adjacent seats 104*a*–104*c* are illustrated together. In a first instance, a laptop computer 100*a* is positioned on a tray table 106*a* and the printer 50*a* is disposed within a seat back storage pocket 108*a*. In a second instance, a laptop computer 100*b* is disposed on top of the printer 50*b* which is positioned on top of the tray table 106*b*. In a third instance, the laptop computer 100*c* is disposed on a tray table 106*c* while the printer 50*c* is disposed under the seat 104*c*.

Thus, a portable printer is provided for enabling ease of use within a confined travel situation such as within a mobile platform passenger compartment. Advantageously, the portable printer of the present invention includes a paper retention mechanism which retains supply paper prior to printing and printed paper after printing. The paper retention mechanism includes a transparent top panel which enables a user to view the printed paper for quality during a printing operation while still retaining it within a printed paper compartment.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A paper retention assembly for a portable printer comprising:
    a housing;
    a supply paper compartment within said housing;
    a printed paper compartment within said housing;
    wherein said housing further comprises:
        a first panel member;
        a second panel member spaced apart from said first panel member by a wall; and
        a divider separating an interior volume of said housing into said supply paper compartment between said first panel member and said divider, and said printed paper compartment between said second panel member and said divider;
        a supply paper exit port formed in an interior wall portion of said housing downstream of said supply paper compartment; and
        a printed paper entry port formed in said interior wall portion of said housing upstream of said printed paper compartment and spaced apart from said paper supply exit port.

2. The paper retention assembly of claim 1 wherein said second panel comprises a transparent member adjacent said printed paper compartment.

3. The paper retention assembly of claim 1 wherein said second panel comprises an openable panel operable in a first mode enclosing said printed paper compartment and in a second mode exposing said printed paper compartment.

4. The paper retention assembly of claim 1 wherein said supply paper compartment is adjacent to and parallel with said printed paper compartment.

5. A printer comprising:
    a printing assembly; and
    a paper retention assembly coupled to said printing assembly, said paper retention assembly including:
        a housing;
        a supply paper compartment within said housing; and
        a printed paper compartment within said housing;
        a divider separating said housing into said supply paper compartment adjacent to and parallel with said printed paper compartment;
    said printing assembly further comprising:
        a print housing;
        a plurality of guide rollers disposed within said print housing;
        a printing element coupled to said print housing adjacent at least one of said plurality of guide rollers;
        a supply paper entry port formed in a wall portion of said print housing upstream of said printing element; and
        a printed paper exit port formed in said wall portion of said print housing downstream of said printing element, said supply paper entry port being spaced apart from and parallel with said printed paper exit port.

6. The printer of claim 5 wherein said divider is openable to enable access to said supply paper compartment.

7. The printer of claim 5 wherein said housing further comprises a transparent member revealing an interior of said printed paper compartment.

8. A portable printer comprising:
    a printing assembly including:
        a print housing;
        a plurality of guide rollers disposed within said print housing;
        a printing element coupled to said print housing adjacent at least one of said plurality of guide rollers;
        a supply paper entry port formed in one wall of said print housing upstream of said printing element; and
        a printed paper exit port formed in said one wall of said print housing downstream of said printing element and adjacent said supply paper entry port;
    a paper retention assembly removably coupled to said printing assembly, said paper retention assembly including:
        a paper housing having a first panel member spaced apart from a second panel member by a wall;
        a divider separating an interior volume of said paper housing into a supply paper compartment between said first panel member and said divider, and a printed paper compartment between said second panel member and said divider;
        a supply paper exit port formed in one side of said wall of said paper housing downstream of said supply paper compartment; and
        a printed paper entry port formed in said one side of said wall of said paper housing upstream of said printed paper compartment and adjacent said supply paper exit port.

9. The portable printer of claim 8 wherein said second panel includes a transparent portion.

10. The portable printer of claim 8 wherein said second panel is operable in a first mode enclosing said printed paper compartment and a second mode exposing said printed paper compartment, said second panel including a transparent portion formed therein.

11. The portable printer of claim 8 wherein said supply paper compartment is disposed adjacent to and parallel with said printed paper compartment within said paper housing.

12. The portable printer of claim 8 wherein said divider is openable to enable access to said supply paper compartment.

* * * * *